US012381318B2

(12) United States Patent
Raeesi et al.

(10) Patent No.: US 12,381,318 B2
(45) Date of Patent: Aug. 5, 2025

(54) KA-BAND 2D PHASED-ARRAY ANTENNA IN PACKAGE

(71) Applicant: C-COM SATELLITE SYSTEMS INC., Ottawa (CA)

(72) Inventors: Amir Raeesi, Waterloo (CA); Wael Abdel-Wahab, Kitchener (CA); Ardeshir Palizban, Waterloo (CA); Ahmad Ehsandar, Kitchener (CA); Suren Gigoyan, Kitchener (CA); Safieddin Safavi-Naeini, Waterloo (CA)

(73) Assignee: C-COM SATELLITE SYSTEMS INC. (CA)

( * ) Notice: Subject to any disclaimer, the term of this patent is extended or adjusted under 35 U.S.C. 154(b) by 154 days.

(21) Appl. No.: 18/319,060

(22) Filed: May 17, 2023

(65) Prior Publication Data

US 2023/0378642 A1 Nov. 23, 2023

Related U.S. Application Data

(60) Provisional application No. 63/343,155, filed on May 18, 2022.

(51) Int. Cl.
*H01Q 3/30* (2006.01)
*H01Q 3/26* (2006.01)
*H01Q 3/36* (2006.01)

(52) U.S. Cl.
CPC ............ *H01Q 3/30* (2013.01); *H01Q 3/2605* (2013.01); *H01Q 3/36* (2013.01)

(58) Field of Classification Search
CPC ........... H01Q 3/2605; H01Q 3/30; H01Q 3/36
See application file for complete search history.

(56) References Cited

U.S. PATENT DOCUMENTS

2003/0043071 A1* 3/2003 Lilly .................... H01Q 3/2605 342/368
2015/0372361 A1* 12/2015 Abdellatif ............... H01P 1/182 333/135

OTHER PUBLICATIONS

Sadhu, Bodhisatwa, Xiaoxiong Gu, and Alberto Valdes-Garcia, "The More (Antennas), the Merrier: A Survey of Silicon-Based mm-Wave Phased Arrays Using Multi-IC Scaling." IEEE Microwave Magazine, 20.12 (2019), p. 32-50.
A. K. Bhattacharyya, Phased Array Antennas—Floquet Analysis, Synthesis, BFNs and Active Array Systems. Hoboken, NJ, USA: Wiley, 2006.
Rebeiz, Gabriel M., Guan-Leng Tan, and Joseph S. Hayden, "RF MEMS phase shifters: Design and applications." IEEE microwave magazine 3.2 (2002): 72-81.

(Continued)

*Primary Examiner* — Daniel Munoz

(57) ABSTRACT

A phased antenna array in a package is provided. The phased array antenna in a package comprises an antenna array with an integrated passive beamformer network, and at least one actuation mechanism. The passive beamformer network comprises at least one phase shifter, and each of the at least one phase shifter comprises a transmission line having a slow-wave structure and a ceramic. Each of the at least one actuation mechanism comprises a magnet and an electromagnet coil, where the magnet is coupled to the ceramic. The at least one actuation mechanism configured to increase or decrease a gap between the transmission line and the ceramic.

12 Claims, 14 Drawing Sheets

(56) References Cited

OTHER PUBLICATIONS

Herd, Jeffrey S., and M. David Conway, "The evolution to modern phased array architectures." Proceedings of the IEEE 104.3 (2015): 519-529.
Natarajan, Arun, Abbas Komijani, and Ali Hajimiri, "A 24 GHz phased-array transmitter in 0.18/spl mu/m CMOS." ISSCC. 2005 IEEE International Digest of Technical Papers. Solid-State Circuits Conference, 2005.. IEEE, 2005.
Rebeiz, Gabriel M., and Kwang-Jin Koh, "Silicon RFICs for phased arrays." IEEE Microwave Magazine 10.3 (2009): 96-103.
G. Gültepe, T. Kanar, S. Zihir and G. M. Rebeiz, "A 1024-Element Ku-Band Satcom Dual-Polarized Receiver With >10-dB/K G/T and Embedded Transmit Rejection Filter," in IEEE Transactions on Microwave Theory and Techniques, vol. 69, No. 7, pp. 3484-3495, Jul. 2021, doi: 10.1109/TMTT.2021.3073321.
G. Gültepe, T. Kanar, S. Zihir and G. M. Rebeiz, "A 1024-Element Ku-Band Satcom Phased-Array Transmitter With 45-dBW Single-Polarization EIRP," in IEEE Transactions on Microwave Theory and Techniques, doi: 10.1109/TMTT.2021.3075678.
Jakoby, Rolf, Alexander Gaebler, and Christian Weickhmann, 2020. "Microwave Liquid Crystal Enabling Technology for Electronically Steerable Antennas in Satcom and 5G Millimeter-Wave Systems" Crystals 10, No. 6: 514.
A. Franc, O. H. Karabey, G. Rehder, E. Pistono, R. Jakoby and P. Ferrari, "Compact and Broadband Millimeter-Wave Electrically Tunable Phase Shifter Combining Slow-Wave Effect With Liquid Crystal Technology," in IEEE Transactions on Microwave Theory and Techniques, vol. 61, No. 11, pp. 3905-3915, Nov. 2013, doi: 10.1109/TMTT.2013.2282288.
M. Jost et al., "Miniaturized Liquid Crystal Slow Wave Phase Shifter Based on Nanowire Filled Membranes," in IEEE Microwave and Wireless Components Letters, vol. 28, No. 8, pp. 681-683, Aug. 2018, doi: 10.1109/LMWC.2018.2845938.
H. Al-Saedi et al., "A Low-Cost Ka-Band Circularly Polarized Passive Phased-Array Antenna for Mobile Satellite Applications," in IEEE Transactions on Antennas and Propagation, vol. 67, No. 1, pp. 221-231, Jan. 2019, doi: 10.1109/TAP.2018.2878335.
J. Wu et al., "Compact, Low-Loss, Wideband, and High-Power Handling Phase Shifters With Piezoelectric Transducer-Controlled Metallic Perturber," in IEEE Transactions on Microwave Theory and Techniques, vol. 60, No. 6, pp. 1587-1594, Jun. 2012.
Z. Rahimian Omam et al., "Tunable Substrate Integrated Waveguide Phase Shifter Using High Dielectric Constant Slab," in IEEE Microwave and Wireless Components Letters, vol. 30, No. 5, pp. 485-488, May 2020, doi: 10.1109/LMWC.2020.2980264.
N. Ranjkesh, M. Basha, A. Abdellatif, S. Gigoyan and S. Safavi-Naeini, "Millimeter-Wave Tunable Phase Shifter on Silicon-on-Glass Technology," in IEEE Microwave and Wireless Components Letters, vol. 25, No. 7, pp. 451-453, Jul. 2015.
A. Raeesi, H. Al-Saedi, W. M. Abdel-Wahab, S. Gigoyan and S. Safavi Naeini, "Ka-Band Circularly-Polarized Antenna Array with Wide Gain and Axial Ratio Bandwidth," 2021 15th European Conference on Antennas and Propagation (EuCAP), 2021, pp. 1-5, doi: 10.23919/EuCAP51087.2021.9411453.
A. Nafe, K. Kibaroglu, M. Sayginer and G. M. Rebeiz, "An In-Situ Self-Test and Self-Calibration Technique Utilizing Antenna Mutual Coupling for 5G Multi-Beam TRX Phased Arrays," 2019 IEEE MTT-S International Microwave Symposium (IMS), 2019, pp. 1229-1232, doi: 10.1109/MWSYM.2019.8701072.
Z. R. Omam et al., "Ka-Band Passive Phased-Array Antenna With Substrate Integrated Waveguide Tunable Phase Shifter," in IEEE Transactions on Antennas and Propagation, vol. 68, No. 8, pp. 6039-6048, Aug. 2020, doi: 10.1109/TAP.2020.2983838.
N. Kingsley, G. E. Ponchak and J. Papapolymerou, "Reconfigurable RF MEMS Phased Array Antenna Integrated Within a Liquid Crystal Polymer (LCP) System-on-Package," in IEEE Transactions on Antennas and Propagation, vol. 56, No. 1, pp. 108-118, Jan. 2008, doi: 10.1109/TAP.2007.913151.
K. Topalli, Ö. A. Civi, S. Demir, S. Koc and T. Akin, "A Monolithic Phased Array Using 3-bit Distributed RF MEMS Phase Shifters," in IEEE Transactions on Microwave Theory and Techniques, vol. 56, No. 2, pp. 270-277, Feb. 2008, doi: 10.1109/TMTT.2007.914377.
M. Nikfalazar et al., "Two-Dimensional Beam-Steering Phased-Array Antenna With Compact Tunable Phase Shifter Based on BST Thick Films," in IEEE Antennas and Wireless Propagation Letters, vol. 16, pp. 585-588, 2017, doi: 10.1109/LAWP.2016.2591078.
A. Nafe, F. A. Ghaffar, M. F. Farooqui and A. Shamim, "A Ferrite LTCC-Based Monolithic SIW Phased Antenna Array," in IEEE Transactions on Antennas and Propagation, vol. 65, No. 1, pp. 196-205, Jan. 2017, doi: 10.1109/TAP.2016.2630502.
Y. Ji, L. Ge, J. Wang, Q. Chen, W. Wu and Y. Li, "Reconfigurable Phased-Array Antenna Using Continuously Tunable Substrate Integrated Waveguide Phase Shifter," in IEEE Transactions on Antennas and Propagation, vol. 67, No. 11, pp. 6894-6908, Nov. 2019, doi: 10.1109/TAP.2019.2927813.
D. Wang, E. Polat, H. Tesmer, R. Jakoby and H. Maune, "A Compact and Fast 1×4 Continuously Steerable End-Fire Phased-Array Antenna Based on Liquid Crystal," in IEEE Antennas and Wireless Propagation Letters, doi: 10.1109/LAWP.2021.3096035.

* cited by examiner

KA-BAND 2D PHASED-ARRAY ANTENNA IN PACKAGE

CROSS-REFERENCE TO RELATED APPLICATION

This application claims priority to U.S. Provisional Patent Application No. 63/343,155, the entire contents of which is incorporated by reference herein for all purposes.

TECHNICAL FIELD

The present disclosure relates to phased array antenna systems, and in particular to a phased array antenna system in a package for millimeter wave technology.

BACKGROUND

Millimeter wave (mm-Wave) technology is used for high-data rate requirements for emerging communication applications including backhauling in cellular networks, satellite communication, radar remote sensing, and etc. A phased-array antenna (PAA) system may be able to compensate the path loss, and relax the requirements of the RF transceiver front-ends at mm-Wave frequencies.

However, for large-scale PAA systems, passive architecture may not be a practical solution as the loss of the beamforming network degrades the performance of the system, particularly at mm-Wave where both dielectric and metallic losses are substantial.

In some passive PAA (P-PAA) systems, the phase shifter shows average insertion loss of 8 dB which is extremely high and/or the measured gain for the antenna array shows that the phase shifter has high insertion loss. LC-based phase shifters and semiconductor-based phase shifters have also shown high insertion loss. Metallic and dielectric structures have been used as well, however the area of the phase shifter is relatively large for a planar 2D beam-steering P-PAA.

Accordingly, an additional, alternative, and/or improved PAA system with low insertion loss and with a phase shifter having a small footprint is desired.

SUMMARY

In accordance with an aspect of the present disclosure, a phased antenna array in a package is disclosed, the phased antenna array package comprising an antenna array with an integrated passive beamformer network, the passive beamformer network comprising at least one phase shifter, each of the at least one phase shifter comprising a transmission line having a slow-wave structure and a ceramic; and at least one actuation mechanism; each of the at least one actuation mechanism comprising a magnet and an electromagnet coil, the magnet being coupled to the ceramic. The at least one actuation mechanism configured to increase or decrease a gap between the transmission line and the ceramic.

In the phased antenna array package, the passive beamformer network comprises a feeding network.

In the phased antenna array package, each of the at least one phase shifter has a small footprint size.

In the phased antenna array package, each of the at least one phase shifter has a low insertion loss.

In the phased antenna array package, the antenna array comprises 16 antenna elements, and each antenna element is integrated with one of the at least one phase shifter and one of the at least one actuation mechanism.

BRIEF DESCRIPTION OF THE FIGURES

Further features and advantages of the present disclosure will become apparent from the following detailed description, taken in combination with the appended drawings, in which.

DETAILED DESCRIPTION

A phased array antenna (PAA) in a package system is provided. The phased array antenna may be a 4×4 antenna array with an integrated passive beamformer for low-cost and efficient millimeter wave applications. In PAA systems, an electronic beamforming network may be used to control the phase and amplitude of the radiated electromagnetic (EM) fields of each antenna element independently. The implementation of a large-scale FAA system with hundreds to thousands of antenna elements is compatible with the form factor requirement of a communication system. The low-cost and low-complexity implementation of large-scale PAA systems at mm-Wave is important for mass production and deployment due to the large number of elements.

In PAA systems, beamforming can be implemented in different domains including radio frequency (RF), intermediate frequency (IF), local oscillator (LO), and digital baseband. Beamforming in RF domain is a low-cost, low-power approach in large-scale FAA systems as one stage of up/down conversion is used.

Figure 1A:
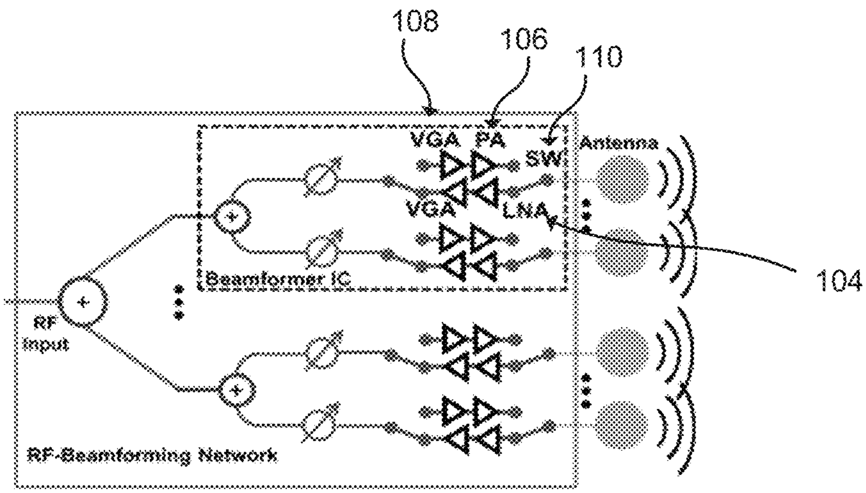
FIGS. 1A and 1B depict architectures of an antenna system.

Active FAA (A-FAA) systems generally incorporate three main RF sub-systems including: antenna elements, active beamformers (transmit/receive (T/R) modules), and a power splitting/combining network. A T/R beamformer module encompasses a phase shifter (PS) 102, a low-noise amplifier (LNA) 104, a power amplifier (PA) 106, either a variablegain amplifier (VGA) 108 or an RF attenuator, RF switches (SW) 110, and digital unit as shown, for example, in FIG. 1A. It will be appreciated that numbers of beamformer modules may be merged on a silicon-based integrated circuit (IC) chip.

Figure 1B:
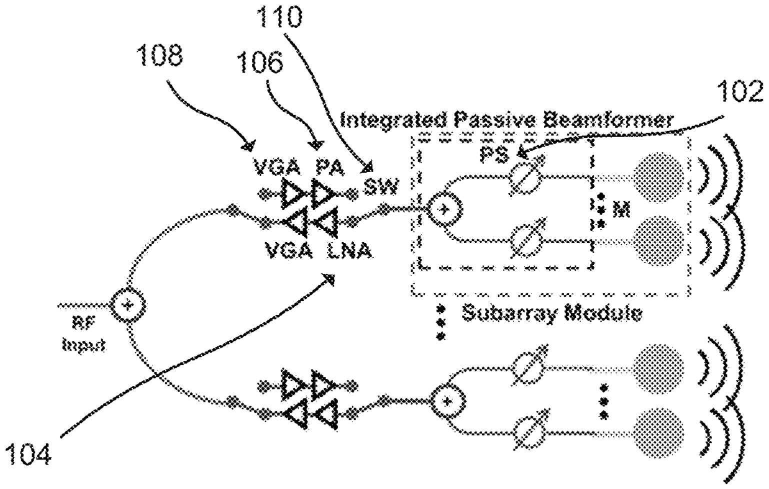

Different silicon-based processes including silicon-germanium (SiGe) bipolar CMOS (BiCMOS) and silicon CMOS technology have been used for the development of multi-channel beamformer ICs. Silicon-based technology may make it possible to integrate the digital unit in the IC chip. Employing multi-channel beamformer ICs in large-scale FAA systems allows for a practical solution to reduce the cost and complexity of the system. An alternative solution in lowering the cost and complexity of A-PAA systems is a hybrid approach that combines active and passive FAA (P-PAA) architectures. A system architecture of the hybrid is shown, for example, in FIG. 1B. The active components (for example, PA, LNA, etc.) are shared between groups of antenna elements which form subarrays, where the amplitude control is executable. It will be appreciated that hybrid architecture may reduce the cost and complexity of the system if the number of active devices is reduced and with passive beamformers having low insertion loss and compact size. An RF passive beamformer network incorporates a splitter/combiner and phase shifters. The embedded phase shifter's insertion loss is as small as possible to avoid performance degradation. It will be appreciated that the phase shifter footprint is relatively small for planar 2D FAA designs where the area of the phase shifter is limited by the distance (d) between the radiating antenna elements (approximately $d=0.5\times\lambda_0$ where $\lambda_0$ is the free space wavelength of the highest operating frequency).

Figure 2:
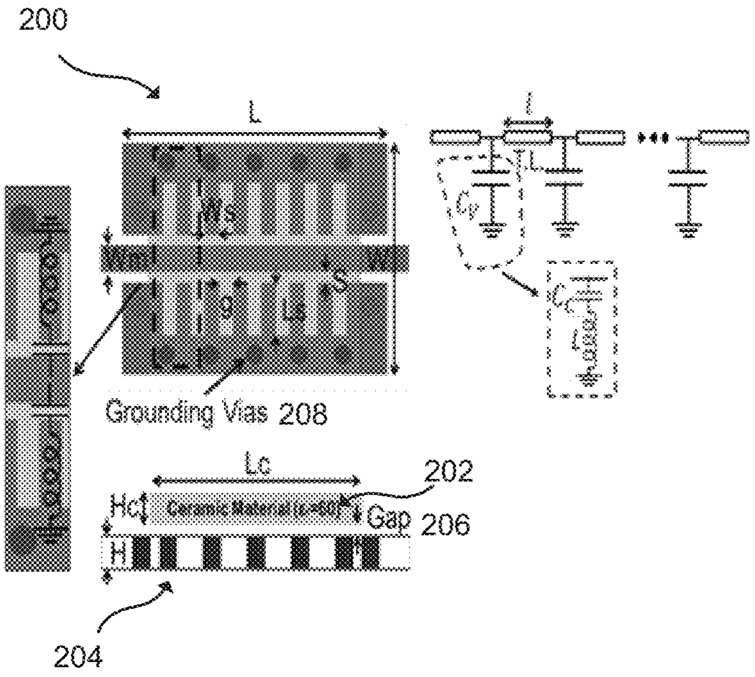
FIG. 2 depicts an embodiment of a structure of a slow-wave microstrip line phase shifter of a P-PAA system.

FIG. 2 depicts an embodiment of a structure of a slow-wave microstrip line phase shifter 200 of the PAA system. The phase shifter is a tunable phase shifter. It will be appreciated that in order to shrink the size of the phase shifter, a slow-wave mechanism is employed. The slow-wave mechanism is realized by adding capacitive loads ($C_v$) to the microstrip transmission line (MSL) periodically. The capacitive loads ($C_v$) may be realized by a series L-C resonator operating below its resonance frequency.

As depicted in FIG. 2, a ceramic material 202 is above the slow-wave microstrip transmission line 204. The ceramic material 202 and the slow-wave microstrip transmission line 204 are separated by a gap 206. The slow-wave microstrip transmission line 204 comprises grounding vias 208.

Figure 3A:
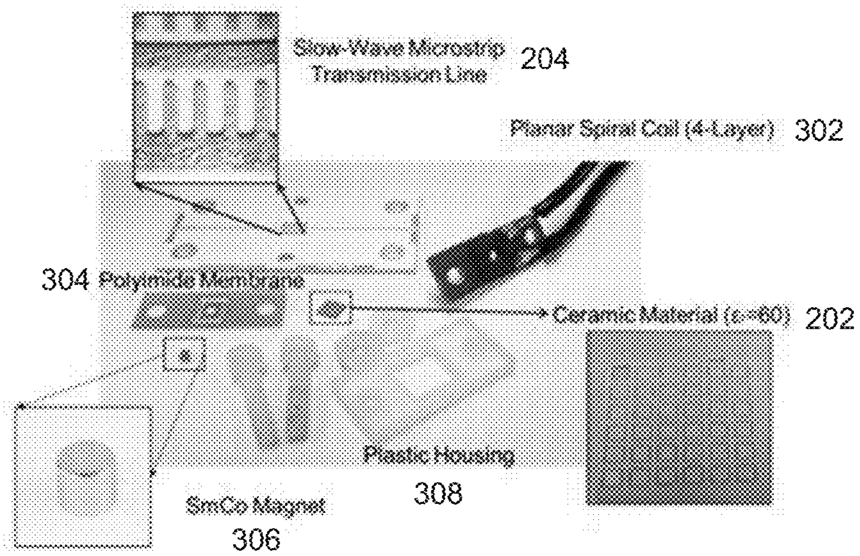
FIGS. 3A to 3C depict an embodiment of the phase shifter.
Figure 3B:
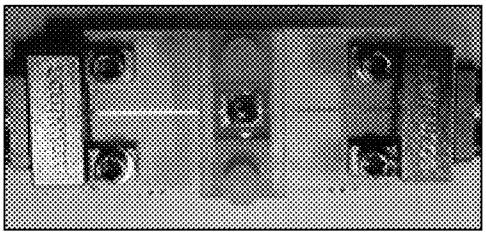
Figure 3C:
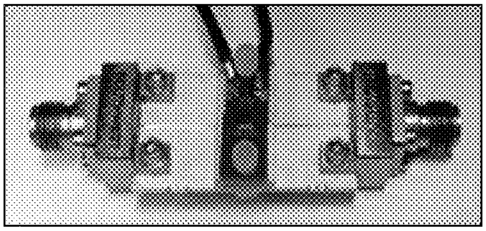

FIGS. 3A to 3C depict an embodiment of the phase shifter 200. FIG. 3A depicts the components of the phase shifter comprising a slow-wave microstrip transmission line 204, a planar spiral coil 302, a polyimide membrane 304, a ceramic material 202, a SmCo magnet 306, and plastic housing 308. It will be appreciated that the planar spiral coil 302 may be a 4-layer planar spiral coil and the ceramic material 202 may have a dielectric constant of $\varepsilon_r=60$ and loss tangent of tgδ=0.005. FIG. 3B depicts the permanent magnet 306 and the ceramic 202 adhered to each side of the membrane 304 using an adhesive material. FIG. 3C depicts the packaged phase shifter. The phase shifter can operate over a frequency range of about 27-30 GHz. The MSL having the slow-wave structure 204 comprises a RO4360 with a dielectric constant of $\varepsilon_r=6.15$, a loss tangent of tgδ=0.003, and a thickness of H=0.203 mm. Parameters of the phase shifter shown in FIGS. 2 and 3A-3C are listed in Table I.

TABLE I

DESIGN PARAMETERS OF THE STRUCTURE (MM)

| Parameter | | Parameter | | Parameter | |
|---|---|---|---|---|---|
| L | 3 | Ws | 0.16 | S | 0.11 |
| Lc | 2.4 | Ls | 0.55 | Wm | 0.28 |
| W | 2.4 | g | 0.16 | Hc | 0.2 |

The resonator design parameters (i.e. $W_s$, $L_s$, and S) are optimized such that it resonates at 32 GHz at a gap distance of 2 um. The unit cell length is set to $l=2\times W_s=320$ um. Each unit cell may provide 50° of phase shift at 30 GHz. Eight unit cells in cascade may satisfy the full phase tuning range coverage at 30 GHz. A low-profile magnetic actuator is employed to move the ceramic material with respect to the line and changes the gap distance. It will be appreciated that the phase shifter may operate based on the principle of loaded-transmission line phase shifters. It will be further appreciated that other parameters may be set for the phase shifter 200.

Figure 4A:
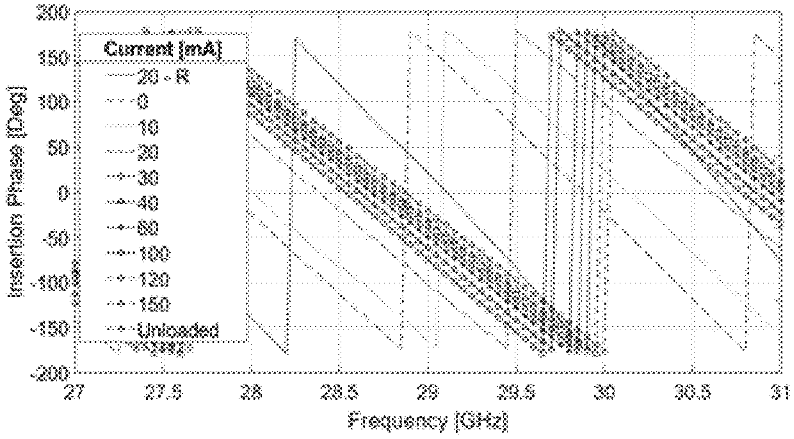
FIGS. 4A and 4B depict measurement results of the frequency response of the phase shifter for different DC currents.
Figure 4B:
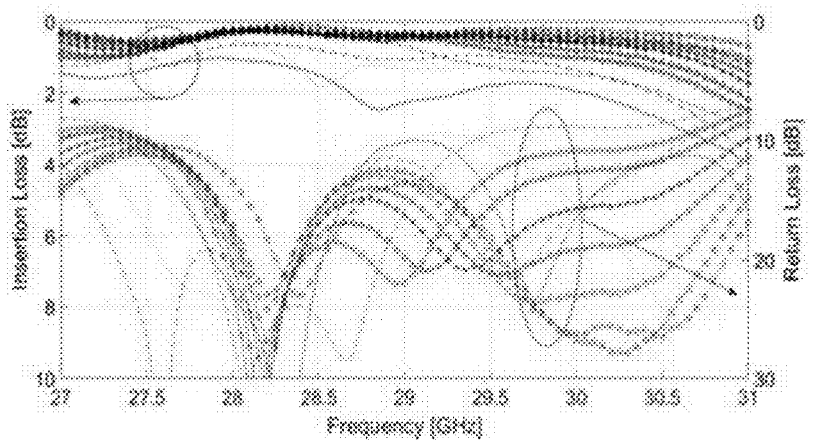

FIGS. 4A and 4B depict measurement results of the frequency response of the phase shifter for different DC currents. FIG. 4A shows a phase tuning range of about 380° can be reached by the phase shifter at 30 GHz. FIG. 4B depicts a return loss of more than 10 dB and an insertion loss of 1.4±0.9 dB in the frequency range of 27-30 GHz at all the tuning states for the phase shifter. It will be appreciated that during testing, the actuator draws up to 60 mA of the DC current over DC voltage range of 0-0.5 volts for tuning the phase. The present phase shifter provides a full phase tuning range of 380° in a smaller footprint size in addition to maintaining a high figure of merit of FoM=190 at 30 GHz, where FoM is defined by the ratio of the maximum phase tuning range and the maximum insertion loss for all the tuning states at a specific frequency.

The present phased shifter not only shows low insertion loss and insertion loss variation for the full tuning range, but also has a small size. The phase may be tuned by moving the high-dielectric ceramic material 202 over the slow-wave microstrip line 204. The movement may be done using a magnetic actuation system as described below.

Figure 5A:
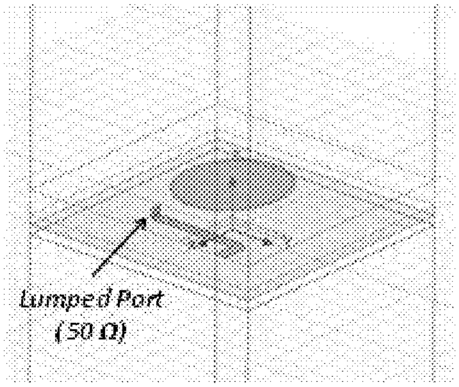
FIGS. 5A to 5C depict an embodiment of an antenna element structure and build-up of the P-PAA system.
Figure 5B:
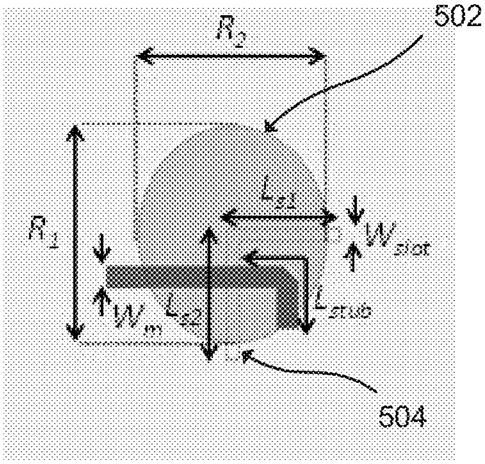
Figure 5C:

FIGS. 5A to 5C depict an embodiment of an antenna element structure and build-up of the FAA system. The antenna element is an elliptical patch antenna excited by a microstrip line through an L-shaped slot. Three metal layers (ML1, ML2, ML3), two dielectric substrates 510, 512, and an adhesive layer 514 form the buildup of the structure as shown in FIG. 5C. It will be appreciated that RO4003 may be used as the antenna substrate 510, having a permittivity of $\varepsilon_r=3.55$, a thickness of 0.508 mm, and a loss tangent of tgδ=0.0035. The patch 502 has an elliptical shape with a major axis length of $R_1=2.8$ mm and a minor axis length of $R_2=2.45$ mm as shown in FIG. 5B. The elliptical shape may provide more degrees of freedom for the realization of circularly-polarized (CP) radiation. The feed substrate 512 may be RO4360 with a dielectric constant of $\varepsilon_r=6.15$, a thickness of $h_3=0.203$ mm, and a loss tangent of tgδ=0.003. The adhesive 514 may be Rogers 4450 with a permittivity of $\varepsilon_r=3.5$, a thickness of $h_2=0.203$ mm, and a loss tangent of tgδ=0.003. An L-shaped slot 504 is present in the second metal layer. The L-shaped slot 504 may have two arms with lengths of $l_{s1}=1.311$ mm and $l_2=1.529$ and a slot width of $W_{slot}=0.161$ mm. The L-shaped slot 504 may be used for excitation of two degenerated orthogonal modes with 90° phase difference for CP radiation. In order to provide proper input matching, the length of $L_{stub}$ may be $L_{stub}=1.37$ mm.

Figure 6:
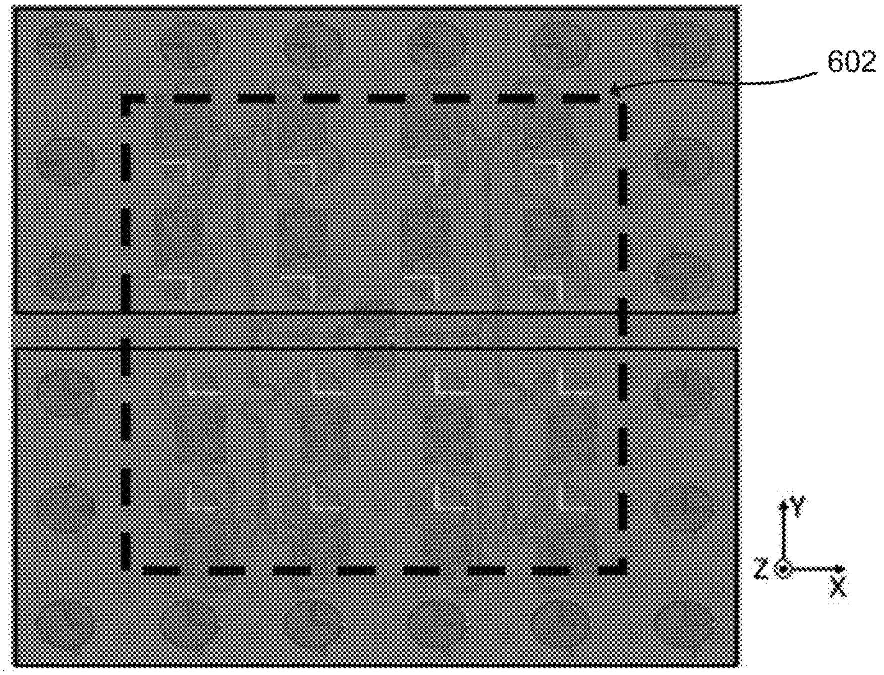
FIG. 6 depicts an array configuration.

It will be appreciated that in, for example, a simulation environment, the antenna element may be surrounded from the sides by periodic boundaries and from the top and bottom by radiation boundaries. The antenna has a wide impedance bandwidth of 27-31 GHz, a peak gain of 6.7 dBic and an axial ratio of less than 3 dB in the frequency range of 28.2-29.6 GHz. It will be appreciated that the properties of the antenna element structure may be different from that described above, and still provide similar results, FIG. 6 depicts an array configuration 600. As depicted, sixteen antenna elements may be located in square lattice configuration. The element spacing may be $0.6\times\lambda_0$, where $\lambda_0$ is the free space wavelength at 30 GHz. The distance between the antenna elements may allow for a grating lobe-free scanning angle up to $\theta_s=46°$. The upper half of the array is rotated 180° counterclockwise around the z-axis with respect to the lower half to provide more space for laying out the phase shifters and a splitter/combiner network of the PAA system. In order to compensate for such a rotation, 180° phase shift may be provided in the splitter/combiner network. Non-radiating antenna elements may be located along the edges of the array to provide the same boundaries seen by the central elements of the array. It will be appreciated that the non-radiating elements in FIG. 6 are the elements outside of the dashed square 602, and the elements inside the dashed square 602, are radiating antenna elements. It will be further appreciated that although sixteen antenna elements (i.e. a 4×4 antenna array) are described and depicted, another antenna array with a different number of antenna elements may instead be used.

The splitting/combining network or feeding network of the PAA system may be a sixteen-way microstrip Wilkinson power divider fed by a miniaturized surface-mount connector. The power divider may comprise RO4360 with a dielectric constant of $\varepsilon_r=6.15$, a thickness of $h_3=0.203$ mm, and a loss tangent of $tg\delta=0.003$. The power divider may have an average insertion loss of 1.5 dB with ±0.5 dB variation. It will be appreciated that for each half, a phase imbalance of less than 10° among the power divider output branches is present. It will be further appreciated that half of the output ports or branches have an extra phase shift of 180° to compensate for the rotation of the upper half of the antenna array as described above. By employing a Wilkinson power divider, the coupling level between the output branches may be relatively low and the output branches may be matched. The matching of the output branches is done for passive phased-array antenna systems as the phase shifter is directly connected to the output branch of the power divider and any mismatch could degrade the performance of the phase shifter of the PAA system.

Figure 7A:
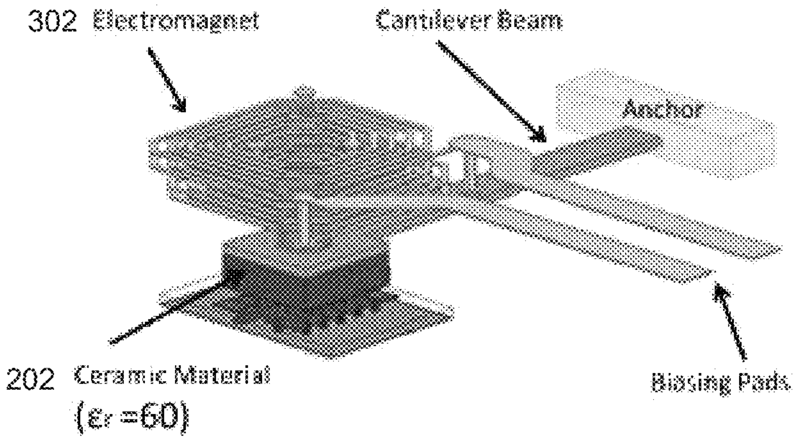
FIGS. 7A and 7B depict an embodiment of an actuation system configuration of the P-PAA system.
Figure 7B:
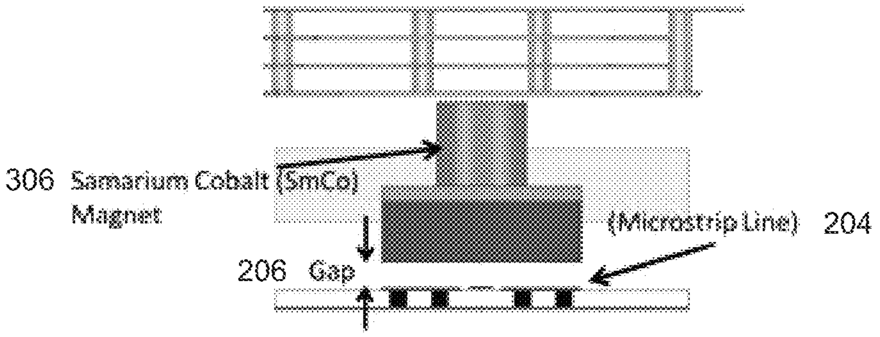

FIGS. 7A and 7B depict an embodiment of an actuation system configuration of the PAA system. A low-profile magnetic actuator is employed to move the ceramic slab or material 202 vertically with respect to the microstrip line 204 to change the gap distance 206. The actuation system comprises a miniaturized light-weight permanent magnet 306 made of samarium-cobalt with high magnetization, FR4 printed circuit board (PCB) spacers, a planar 4-layer spiral coil 302, and a membrane (for example, membrane 304). The miniaturized magnet may have a cylindrical shape with a diameter of 1.1 mm and a height of 0.5 mm. The membrane may be made of a thin polyimide layer with proper elasticity for movement. A modulus of elasticity of the polyimide is 2.5 GPa, and the membrane may have a thickness of 150 um. The magnetic actuator utilizes repulsion and attraction forces between the permanent magnet 306 and the planar electromagnetic coil 302 to move the ceramic 202 vertically with high precision. The range of the force may be controlled by DC current passing through the electromagnet 302 as shown in FIG. 7A. By passing electric DC current into the coil, a magnetic field is generated which exerts a magnetic force to the permanent magnet and provides the displacement. It will be appreciated that the direction of the DC current determines the direction of the vertical displacement. The electromagnet and the cantilever design parameters may allow for them to be fitted in to a 4×4 array size with an inter-element spacing of 6 mm and may allow for low power consumption.

Figure 8:
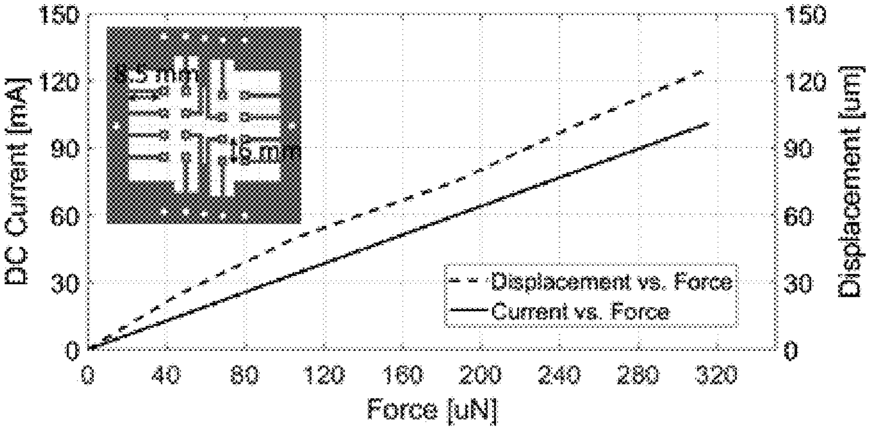
FIG. 8 depicts a force profile of the actuation system with respect to the DC current and the displacement.

FIG. 8 depicts a force profile of the actuation system with respect to the DC current and the displacement when analyzed using Ansys Maxwell and Ansys Mechanical. The interaction between the electromagnet and the magnet shows a generated actuation force range of 0-316 uN when the DC current changes from 0 mA to a maximum available DC current of 100 mA, as shown in FIG. 8. It is also shown that the generated force by the actuator provides the vertical displacement range of 0-130 um.

Figure 9A:
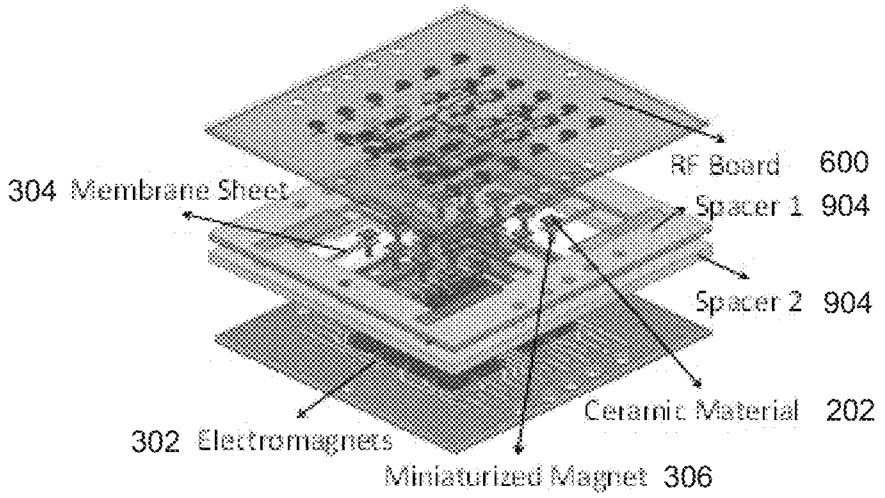
FIG. 9A depicts an exploded view of the P-PAA system assembly.
Figure 9B:
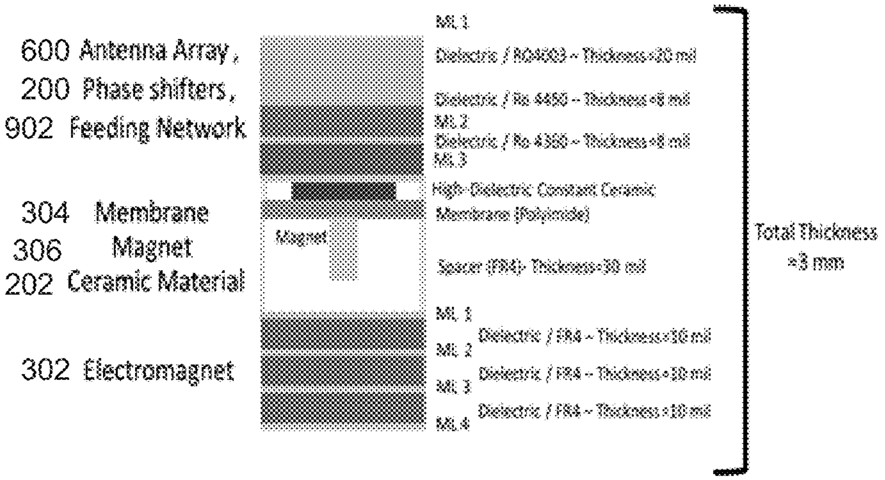
FIG. 9B depicts a PCB layer stack-up of the P-PAA system.

FIG. 9A depicts an exploded view of the P-PAA system assembly and FIG. 9B depicts a PCB layer stack-up of the P-PAA system. The P-PAA system comprises an antenna array or RF board 600, phase shifters 200, a feeding network 902, a membrane 304, a magnet 306, a ceramic material 202, and an electromagnet 302. The system assembly further comprises one or more spacers 904. It will be appreciated that the layout of the polyimide membrane sheet 304 may have 16 cantilever beams with an optimized cantilever length of 8.5 mm. It will be appreciated that the overall thickness becomes 3 mm after assembling all parts.

As depicted in FIG. 9A and described above, the P-PAA system comprises sixteen antenna elements and sixteen actuation systems each comprising the cantilever beam, ceramic material 202, electromagnet 302, and magnet 306.

Figure 10A:
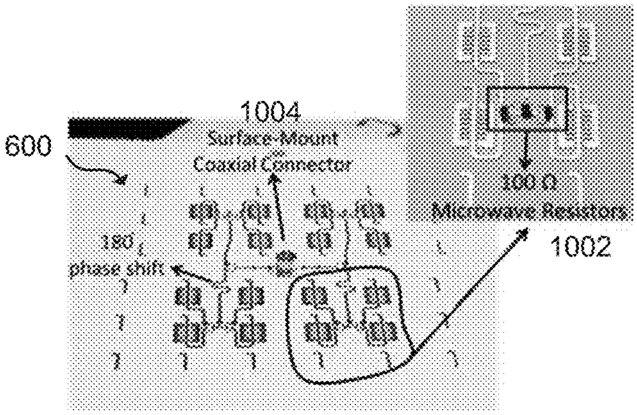
FIGS. 10A to 10E depict assembled subsystems of the P-PAA system.
Figure 10B:
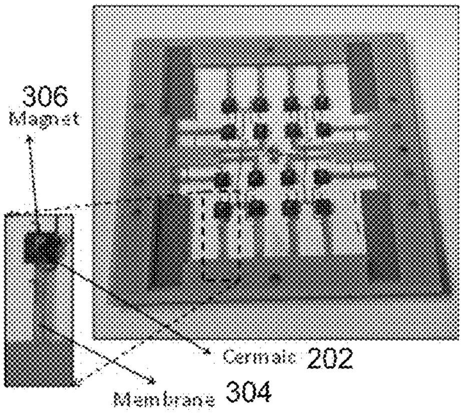
Figure 10C:
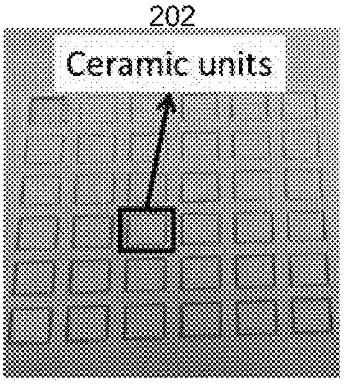
Figure 10D:
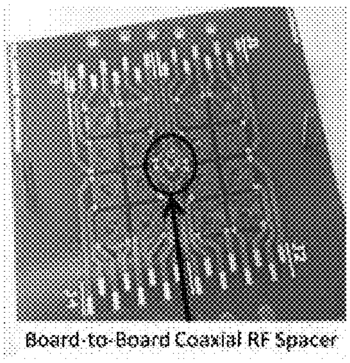
Figure 10E:
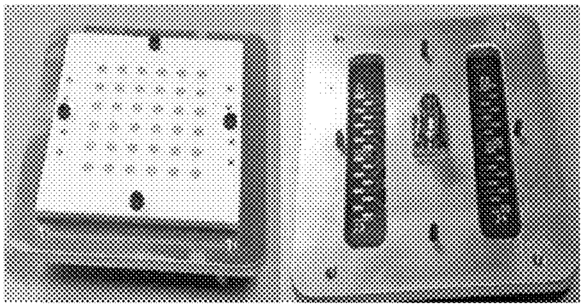

FIGS. 10A to 10E depict embodiments of assembled subsystems of the PAA system. FIG. 10A depicts an embodiment of the RF board 600 with soldered 100Ω resistors 1002 and a surface-mount RF connector 1004. FIG. 10B depicts an embodiment of the membrane sheet 304 attached to magnets 306 and ceramic materials 202 with epoxy. FIG. 10C depicts ceramic cuts for the ceramic materials 202 done using a laser machine. FIG. 10D depicts an embodiment of the electromagnet PCB board stacked with the membrane sheet and the RF board. FIG. 10E depicts an embodiment of the full package. It will be appreciated that standard multilayer PCB fabrication processes are used to fabricate the antenna array with a back-plane feeding network, and the electromagnet as shown in FIG. 10A, and FIG. 10D, respectively. The membrane sheet, ceramic blocks, and PCB spacers may be machined by a PCB manufacturer with acceptable accuracy as shown in FIG. 10B, and FIG. 10C. The magnets and ceramic blocks are adhered to the polyimide sheet using, for example, epoxy materials. The magnets are assembled in such a way that their polarization direction is the same. FIG. 10E shows an embodiment of the final P-PAA packaged. The surface-mount RF connector on the RF board is connected to the SubMiniature version A (SMA) adaptor through a board-to-board coaxial RF spacer during testing. The whole system may be stacked and connected to a metallic fixture using screws at the edges. The actuation system is tuned by high-precision tunable current sources. It will be appreciated that spacer 1 (904) may be used between the RF board and the membrane sheet in order to compensate for the ceramic thickness, and spacer 2 (904) may be used to provide enough space for the vertical displacement of the magnet.

Figure 11:
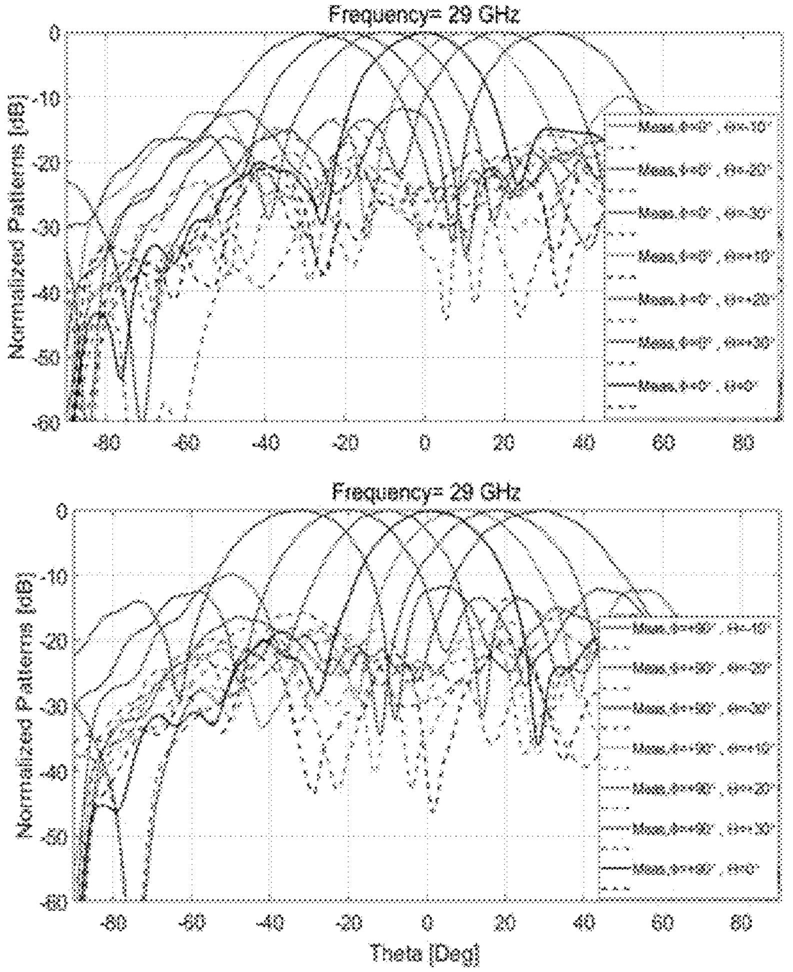
FIG. 11 depicts measurement results of the P-PAA system of the co-pol (left-handed circularly-polarized (LHCP)) and x-pol (right-handed circularly-polarized (RHCP))

FIG. 11 depicts measurement results of the P-PAA system of the co-pol (left-handed circularly-polarized (LHCP)) and x-pol (right-handed circularly-polarized (RHCP)). As depicted, a maximum measured phase tuning range provided by all of the sixteen phase shifters does not exceed 330°. It is appreciated that a maximum phase tuning range of 330° provides a maximum grating lobe-free scan angle of 32°, which is shown by measuring maximum scan angle $\theta_{s,max}$=30°.

Although a standalone phase shifter provides more than 380° of the phase shift in measurements, it provides 330° when embedded in the antenna system. It will be appreciated that accurate fabrication and assembly processes of the system provide accurate initial positioning of the ceramics with respect to the MSL.

Figure 12:
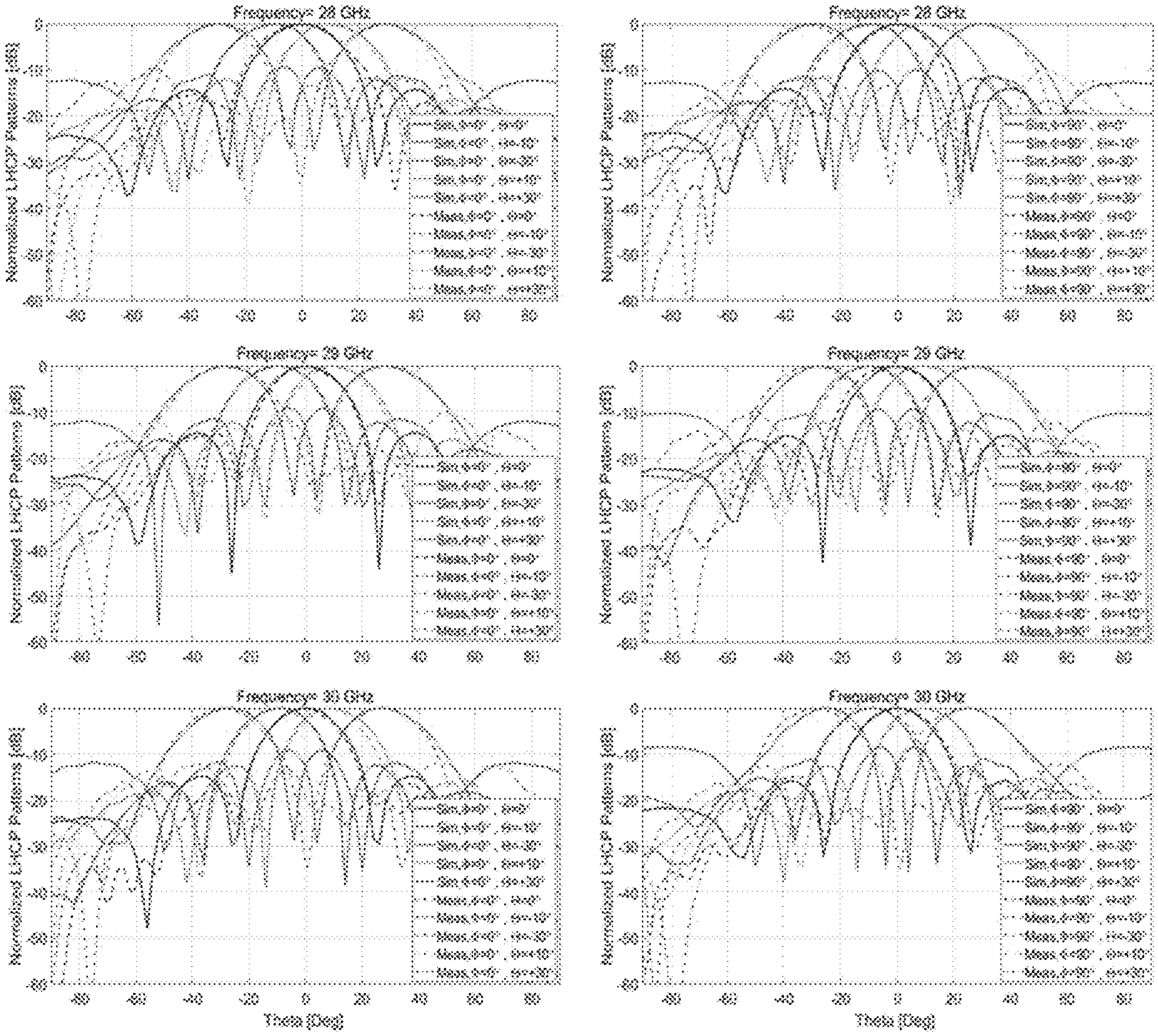
FIG. 12 depicts measurement results of the radiation pattern for different scan angles in two planes of X-Z and Y-Z.

FIG. 12 depicts measurement results of the radiation pattern for different scan angles in two planes of X-Z and Y-Z. The measured CP radiation patterns may be formed and measured at different scan angles 0°, ±10°, and ±30°. The antenna radiates LHCP waves with co-pol/X-pol discrimination more than 14 dB at all the steering angles at 29 GHz with side lobe levels (SLLs) less than −10 dB, as shown in FIG. 11.

Figure 13:
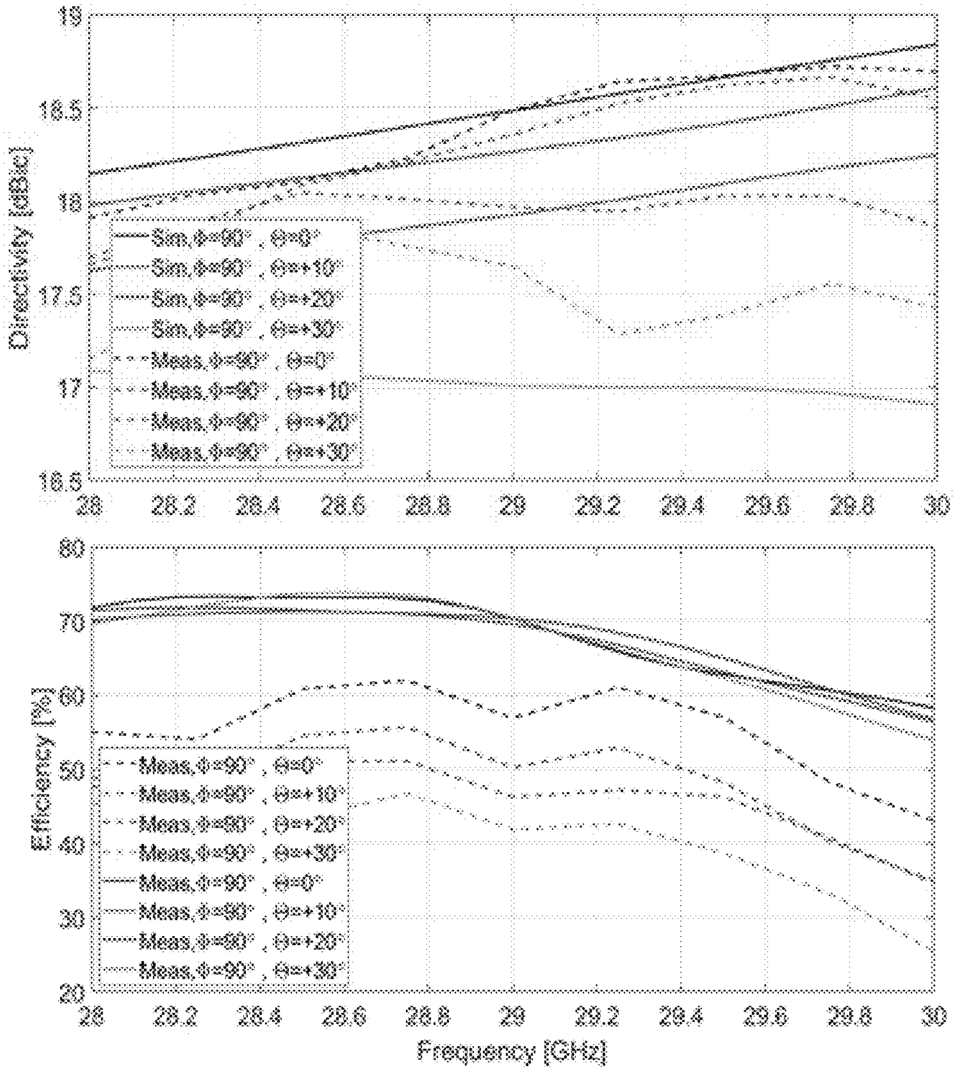
FIG. 13 depicts simulation and measurement results of the peak directivity and the radiation efficiency for different scan angles.

FIG. 13 depicts simulation and measurement results of the peak directivity and the radiation efficiency for different scan angles. Both directivity (dBic) and efficiency (%) of the P-PAA system are measured at different scan angles over the frequency bandwidth of 28-30 GHz. The antenna shows measured peak directivity of ~18 dBic with ±0.5 dB difference between the measured and simulated directivity results which is attributed to the amplitude imbalance between the antenna elements. The simulation results show the radiation efficiency of more than 55% over the operating frequency bandwidth at all the scan angles. Alternatively, the measured radiation efficiency results show the radiation efficiency of more than 26%.

Figure 14:
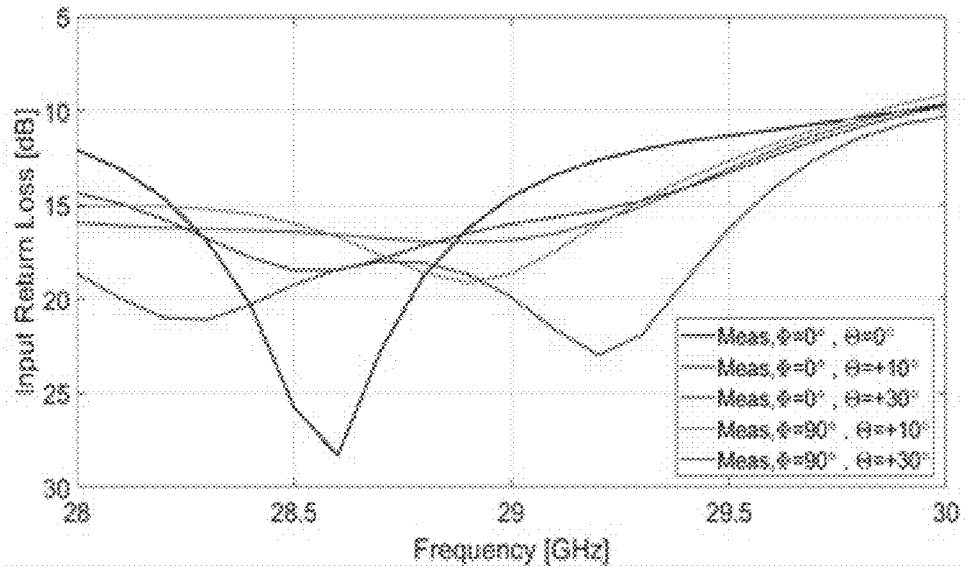
FIG. 14 depicts measured input return loss of the antenna system for different scan angles.

FIG. 14 depicts measured input return loss of the antenna system for different scan angles. The antenna system maintains an input return loss of more than 10 dB over the operating frequency bandwidth of 28-30 GHz. It will be appreciated that the actuation system consumes the maximum DC power ~60 mW by each phase shifter. Table II compares the present P-PAA system to existing systems published in literature. The present system not only provides two-dimensional beam steering capability, but also shows relatively higher efficiency.

It will be appreciated that prior to the radiation pattern measurements, the integrated phase shifters may be characterized by near-field planar scanner system. For characterizing the phase shifters, an open-waveguide (OWG) probe may be positioned in front of each antenna element, and the transmission coefficient (S21, where port 1 is the input to the antenna systems and port two is the output of the OWG probe) may be measured for different DC current states. The distance from the probe to each antenna element may be 5 mm for a measurement at 29 GHz. It will be appreciated that the distance must be as small as possible to make sure that the signal captured by the probe is coming from the antenna in front of the probe and not from the adjacent antenna elements. It will be further appreciated that the distance is not too small that the probe loads the antenna and changes its current distribution and input impedance. To characterize the phase shifters, a maximum current is applied to all the actuators in order to place each ceramic at the largest gap distance from the microstrip line (reference state). The current may then be decreased gradually and the differential insertion phase (with respect to the reference state) may be recorded. After reaching a DC current of 0 mA, the direction of the current is reversed to continue the vertical movement down ward. The procedure may be repeated for all sixteen phase shifters by moving the probe in front of the corresponding antenna element.

It will be appreciated that the P-PAA system's radiation patterns may be measured by a planar nearfield (PNF) measurement system. An open rectangular waveguide probe can scan and measure the phase and amplitude of the antenna near field (NF) over a finite plane. In testing the radiation pattern at a specific scan angle, DC currents for realizing the calculated phase shifts distribution over the elements may be applied to the actuation system. Any discrepancies in the measurements and simulations are investigated by characterizing the feeding network loss by simulation and measurement. It will be appreciated that some discrepancies may be due to a simulation not modelling certain factors such as RO4006 laminate properties and the surface roughness of the metal layer at Ka-band.

As described herein, a 4×4 antenna array with integrated passive beamformer for low-cost and efficient millimeter wave applications is provided. The system comprises phase shifters, actuation mechanisms, and a slow-wave structure to

TABLE II

PERFORMANCE COMPARISON OF THE PROPOSED ANTENNA SYSTEM WITH STATE-OF-THE-ART PASSIVE PHASED-ARRAY ANTENNA SYSTEMS

| Reference | $f_0$ [GHz] | Phase shifter Technology | Array Size | Beam steering Coverage | Gain [dBi] (Boresight) | Efficiency (%) (Boresight) | Polarization | Biasing * |
|---|---|---|---|---|---|---|---|---|
| This work | 29 | MEMS-Based | 4 × 4 | ±30°/2D | 15.8 | 58 | CP | 0 mA-100 mA (0 v-0.6 v) |
| [12] | 30 | MEMS-Based | 1 × 4 | ±30°/1D | 7.4 | 60 | LP | 0 mA-100 mA (0 v-0.6 v) |
| [18] | 30 | MEMS-Based | 1 × 4 | ±38°/1D | 8.2 | 48 | CP | 0 mA-100 mA (0 v-0.6 v) |
| [19] | 14 | RF MEMS | 2 × 2 | −4° to 8°/1D | 7.75 | 33 | LP | — |
| [20] | 14.6 | RF MEMS | 1 × 4 | ±14°/1D | — | — | LP | — |
| [21] | 12.8 | BST Ferroelectric | 4 × 4 | ±25°/2D | 8.1 | 7.76 | LP | 0 v-180 v |
| [22] | 13.2 | Ferrite | 2 × 3 | ±19°/1D | 4.9 | — | LP | 0 mA-200 mA** |
| [23] | 5.5 | Varactor Diode | 1 × 4 | ±45°/1D | 11 | — | LP | 0 v-20 v |
| [24] | 29 | Liquid Crystal | 2 × 2 | ±25°/2D | 5.9 | — | LP | 0 v-15 v |
| [25] | 28.4 | Liquid Crystal | 1 × 4 | ±40°/2D | 3.5 | 8.6 | LP | 0 v-5 v |

* The biasing is required for each phase shifter in order to provide its tunability.

**The required range of voltages in not reported for generation of the required current.

shrink the size of the phase shifters. The system may provide a maximum insertion loss of 2.3 dB in all the tuning states and an insertion loss variation of 1.2 dB. In addition, the system provides 380° of the phase tuning range in a compact footprint area of 2.4 mm×3 mm. The antennas main beam can be steered over an angular range of ±30° in both elevation and azimuth planes. The operating frequency bandwidth of the system ranges from 28-30 GHz.

It will be apparent to persons skilled in the art that a number of variations and modifications can be made without departing from the scope of the invention. Although specific embodiments are described herein, it will be appreciated that modifications may be made to the embodiments without departing from the scope of the current teachings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The following documents are referred to herein.

[1] Sadhu, Bodhisatwa, Xiaoxiong Gu, and Alberto Valdes-Garcia. "The More (Antennas), the Merrier: A Survey of Silicon-Based mm-Wave Phased Arrays Using Multi-IC Scaling." IEEE Microwave Magazine 20.12 (2019): 32-50.

[2] A. K, Bhattacharyya, Phased Array Antennas-Floquet Analysis, Synthesis, BFNs and Active Array Systems. Hoboken, NJ, USA: Wiley, 2006.

[3] Rebeiz, Gabriel M., Guan-Leng Tan, and Joseph S. Hayden. "RF MEMS phase shifters: Design and applications." IEEE microwave magazine 3.2 (2002): 72-81.

[4] Herd, Jeffrey S., and M, David Conway. "The evolution to modern phased array architectures." Proceedings of the IEEE 104.3 (2015): 519-529.

[5] Natarajan, Arun, Abbas Komijani, and Ali Hajimiri. "A 24 GHz phased-array transmitter in 0.18/spl mu/m CMOS," ISSCC. 2005 IEEE International Digest of Technical Papers. Solid-State Circuits Conference, 2005. IEEE, 2005.

[6] Rebeiz, Gabriel M., and Kwang-Jin Koh. "Silicon RFICs for phased arrays." IEEE Microwave Magazine 10.3 (2009): 96-103.

[7] G. Gültepe, T. Kanar, S. Zihir and G, M. Rebeiz, "A 1024-Element Ku-Band SATCOM Dual-Polarized Receiver With >10-dB/K G/T and Embedded Transmit Rejection Filter," in IEEE Transactions on Microwave Theory and Techniques, vol. 69, no. 7, pp. 3484-3495, July 2021, doi: 10.1109/TMTT.2021.3073321.

[8] G. Gültepe, T. Kanar, S. Zihir and G. M. Rebeiz, "A 1024-Element Ku-Band SATCOM Phased-Array Transmitter With 45-dBW Single-Polarization EIRP," in IEEE Transactions on Microwave Theory and Techniques, doi: 10.1109/TMTT.2021.3075678.

[9] Jakoby, Rolf, Alexander Gaebler, and Christian Weickhmann. 2020. "Microwave Liquid Crystal Enabling Technology for Electronically Steerable Antennas in SATCOM and 5G Millimeter-Wave Systems" Crystals 10, no. 6: 514.

[10] A. Franc, O. H. Karabey, G. Rehder, E. Pistono, R. Jakoby and P. Ferrari, "Compact and Broadband Millimeter-Wave Electrically Tunable Phase Shifter Combining Slow-Wave Effect With Liquid Crystal Technology," in IEEE Transactions on Microwave Theory and Techniques, vol. 61, no. 11, pp. 3905-3915, November 2013, doi: 10.1109/TMTT.2013.2282288.

[11] M. Jost et al., "Miniaturized Liquid Crystal Slow Wave Phase Shifter Based on Nanowire Filled Membranes," in IEEE Microwave and Wireless Components Letters, vol. 28, no. 8, pp. 681-683, August 2018, doi: 10.1109/LMWC.2018.2845938.

[12] H. Al-Saedi et al., "A Low-Cost Ka-Band Circularly Polarized Passive Phased-Array Antenna for Mobile Satellite Applications," in IEEE Transactions on Antennas and Propagation, vol. 67, no. 1, pp. 221-231, January 2019; doi: 10.1109/TAP.2018.2878335.

[13] J. Wu et al., "Compact, Low-Loss, Wideband, and High-Power Handling Phase Shifters With Piezoelectric Transducer-Controlled Metallic Perturber," in IEEE Transactions on Microwave Theory and Techniques, vol. 60, no. 6, pp. 1587-1594, June 2012.

[14] Z. Rahimian Omam et al., "Tunable Substrate Integrated Waveguide Phase Shifter Using High Dielectric Constant Slab," in IEEE Microwave and Wireless Components Letters, vol. 30, no. 5, pp. 485-488, May 2020, doi: 10.1109/LMWC.2020.2980264.

[15] N. Ranjkesh, M. Basha, A. Abdellatif, S. Gigoyan and S. Safavi-Naeini, "Millimeter-Wave Tunable Phase Shifter on Silicon-on-Glass Technology," in IEEE Microwave and Wireless Components Letters, vol. 25, no. 7, pp. 451-453, July 2015.

[16] A. Raeesi, H. Al-Saedi, W. M. Abdel-Wahab, S. Gigoyan and S. Safavi Naeini, "Ka-Band Circularly-Polarized Antenna Array with Wide Gain and Axial Ratio Bandwidth," 2021 15th European Conference on Antennas and Propagation (EuCAP), 2021, pp. 1-5, doi: 10.23919/EuCAP51087.2021.9411453.

[17] A. Nafe, K. Kibaroglu, M. Sayginer and G. M. Rebeiz, "An In-Situ Self-Test and Self-Calibration Technique Utilizing Antenna Mutual Coupling for 5G Multi-Beam TRX Phased Arrays," 2019 IEEE MTT-S International Microwave Symposium (IMS), 2019, pp. 1229-1232, doi: 10.1109/MWSYM.2019.8701072

[18] Z. R. Omam et al., "Ka-Band Passive Phased-Array Antenna With Substrate Integrated Waveguide Tunable Phase Shifter," in IEEE Transactions on Antennas and Propagation, vol. 68, no. 8, pp. 6039-6048, August 2020, doi: 10.1109/TAP.20202983838.

[19] N. Kingsley, G. E. Ponchak and J. Papapolymerou, "Reconfigurable RF MEMS Phased Array Antenna Integrated Within a Liquid Crystal Polymer (LCP) System-on-Package," in IEEE Transactions on Antennas and Propagation, vol. 56, no. 1, pp. 108-118, January 2008, doi: 10.1109/TAP.2007.913151.

[20] K. Topalli, Ö. A. Civi, S. Demir, S. Koc and T. Akin, "A Monolithic Phased Array Using 3-bit Distributed RF MEMS Phase Shifters," in IEEE Transactions on Microwave Theory and Techniques, vol. 56, no. 2, pp. 270-277, February 2008, doi: 10.1109/TMTT.2007.914377.

[21] M. Nikfalazar et al., "Two-Dimensional Beam-Steering Phased-Array Antenna With Compact Tunable Phase Shifter Based on BST Thick Films," in IEEE Antennas and Wireless Propagation Letters, vol. 16, pp. 585-588, 2017, doi: 10.1109/LAWP.2016.2591078.

[22] A. Nafe, F. A, Ghaffar, M. F. Farooqui and A. Shamim, "A Ferrite LTCC-Based Monolithic SIW Phased Antenna Array," in IEEE Transactions on Antennas and Propagation, vol. 65, no. 1, pp. 196-205, January 2017, doi: 10.1109/TAP.2016.2630502.

[23] Y. Ji, L. Ge, J. Wang, Q. Chen, W. Wu and Y. Li, "Reconfigurable Phased-Array Antenna Using Continuously Tunable Substrate Integrated Waveguide Phase Shifter," in IEEE Transactions on Antennas and Propagation, vol. 67, no. 11, pp. 6894-6908, November 2019, doi: 10.1109/TAP.2019.2927813.

[24] A. Franc, O. H. Karabey, G. Render, E. Pistono, R. Jakoby and P. Ferrari, "Compact and Broadband Millimeter-Wave Electrically Tunable Phase Shifter Combining Slow-Wave Effect With Liquid Crystal Technology," in IEEE Transactions on Microwave Theory and Techniques, vol. 61, no. 11, pp. 3905-3915, November 2013, doi: 10.11091TMTT.2013.2282288.

[25] D. Wang, E. Polat, H. Tesmer, R. Jakoby and H. Maune, "A Compact and Fast 1×4 Continuously Steerable End-Fire Phased-Array Antenna Based on Liquid Crystal," in IEEE Antennas and Wireless Propagation Letters, doi: 10.1109/LAWP.2021.3096035.

The invention claimed is:

1. A phased antenna array in a package comprising:

an antenna array with an integrated passive beamformer network, the passive beamformer network comprising at least one phase shifter, each of the at least one phase shifter comprising a transmission line having a slow-wave structure and a ceramic; and at least one actuation mechanism, each of the at least one actuation mechanism comprising a magnet and an electromagnet coil, the magnet being coupled to the ceramic, the at least one actuation mechanism configured to increase or decrease a gap between the transmission line and the ceramic.

2. The phased antenna array package of claim 1, wherein the passive beamformer network comprises a feeding network.

3. The phased antenna array package of claim 2, wherein the feeding network includes integrated planar slow-wave structures and RF-resistors to increase a phase shifting range.

4. The phased antenna array package of claim 1, wherein each of the at least one phase shifter has a small footprint size.

5. The phased antenna array package of claim 1, wherein each of the at least one phase shifter has a low insertion loss.

6. The phased antenna array package of claim 1, wherein the antenna array comprises 16 antenna elements, and wherein each antenna element is integrated with one of the at least one phase shifter and one of the at least one actuation mechanism.

7. The phased antenna array package of claim 1, wherein the at least one phase shifter provides a tuning range of 330°.

8. The phased antenna array package of claim 1, wherein the ceramic is a high dielectric ceramic.

9. The phased antenna array package of claim 8, wherein the ceramic has a dielectric constant of 60.

10. The phased antenna array package of claim 1, wherein an antenna element of the antenna array is an elliptical patch antenna for generating a circular polarization wave.

11. The phased antenna array package of claim 1, wherein an antenna element of the antenna array comprises a metal layer that includes a slot.

12. The phased antenna array package of claim 1, wherein a first half of the antenna array is rotated 180° counterclockwise around a z-axis with respect to a second half of the antenna array.

* * * * *